(No Model.)
C. F. STILLMAN.
TROTTING SULKY.
No. 335,650. Patented Feb. 9, 1886.
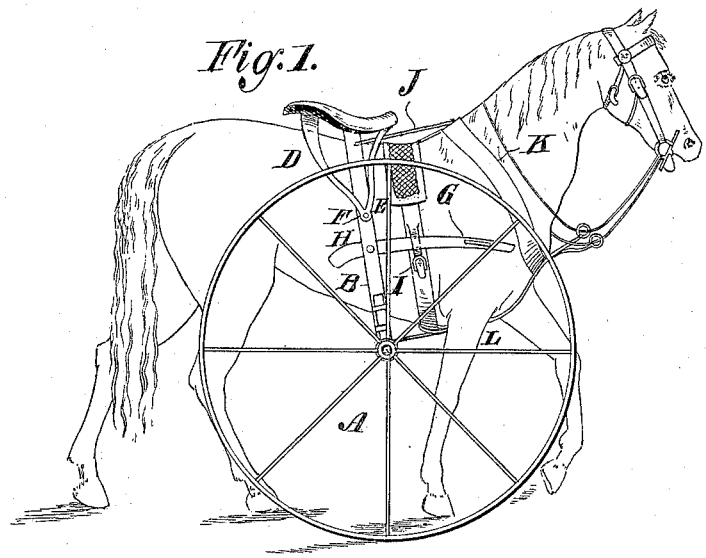
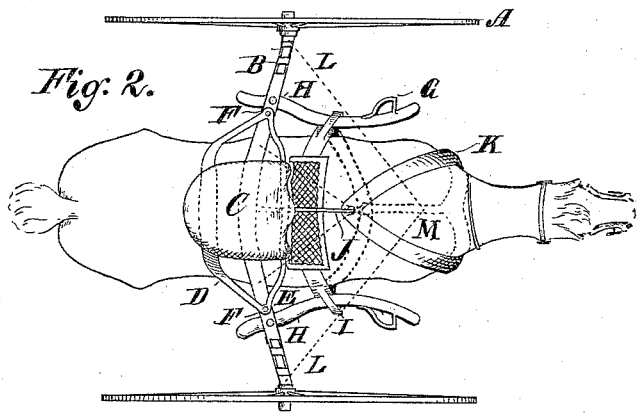

UNITED STATES PATENT OFFICE.

CHARLES F. STILLMAN, OF NEW YORK, N. Y.

TROTTING-SULKY.

SPECIFICATION forming part of Letters Patent No. 335,650, dated February 9, 1886.

Application filed June 29, 1885. Serial No. 170,070. (No model.)

*To all whom it may concern:*

Be it known that I, CHARLES F. STILLMAN, of the city, county, and State of New York, have invented a new and useful Improvement in Trotting-Sulkies, of which the following is a specification.

My invention relates to improvements in that form of sulky for which Letters Patent No. 237,934, February 15, 1881, and No. 244,404, July 19, 1881, have been hitherto granted to me, and in which device the driver's seat is arranged over the back of the horse instead of in the rear of the animal, as is ordinarily the case.

The present invention consists in improvements in the mechanical construction, whereby greater strength is secured, and whereby the up-and-down movement of the horse in trotting is not transmitted through the shaft to the sulky itself, the object being to render the driver's seat more secure, and to decrease the liability to injury to the sulky from strains.

In the accompanying drawings, which illustrate my invention, similar letters of reference indicate like parts.

Figure 1 is a side view, and Fig. 2 is a plan view, of my improved sulky, shown attached to the horse.

Referring to the drawings, A A are the wheels, which are journaled upon short horizontal arms of the axle, which passes up over the back of the horse.

B is the axle, curved upward and over the back of the horse, and of sufficient height above the wheels to allow the horse to move freely under it.

C represents the driver's seat, arranged over the center of the axle and secured thereto in any convenient manner.

D and E are braces fastened to the axle at F, and also the under part of the front and back of the seat. These braces serve the double purpose of stiffening the axle, and acting as a support to the seat.

G G are the shafts, arranged on each side of the axle, and attached thereto by means of the pivots or jointed connections H H. By this arrangement the outer ends of the shafts are free to move up and down, so as to follow the motion of the horse.

In attaching a horse to a sulky constructed according to my invention, the movable shafts are passed through loops I and secured therein, the loops or shaft-attaching device being connected to or made a part of a band or saddle arranged around the horse in the usual manner and position.

Attached to the top of the axle, on each side of the driver's seat, I arrange the straps J, adapted to be adjustably fastened to the center of the top of a band or "Dutch" or "English" collar, K, around the neck of the horse. Similar straps, L, are attached on each side of the sulky to the short horizontal arms of the axle. These straps unite and are adjustably fastened to a strap, M, which connects the breast-collar K with the saddle. The position of the straps J and L is fully shown by the dotted lines in Fig. 2. The straps can be made adjustable at the axle instead of the collar, if desired. The horse in trotting raises and lowers his shoulders, or has an up-and-down motion, which, when the shafts are rigidly attached to the axle, is communicated to the body of the sulky, thus rendering the driver's seat insecure, and impeding the action of the horse. By making the movable connection of the shafts with the axle and fastening the top and lower ends of the axle to the body of the horse, the driver's seat remains in its proper position, and the inclination of the axle varies but little, as the center of motion of the horse is, so to speak, in trotting, at the pivot H.

In order to enable the sulky to be used with a horse of any size, I make the axle in three parts—the central portion arched to pass over the back of the horse, and the two horizontal arms, the latter having their inner ends turned up at a right angle and adapted to enter a slot or tube formed in the ends of the curved portion of the axle, and thus by means of set-screws or other equivalent fastening device the height of the axle can be regulated as desired.

I claim as my invention—

1. A trotting-sulky having two wheels and an axle arched over the back of the horse, and provided with shafts loosely pivoted to the side of said axles, whereby the motion of the horse up and down is not communicated to the driver's seat arranged on said axle, substantially as described.

2. The combination, in a trotting-sulky, of an axle having short horizontal arms at its extremities to receive the wheels, and arched to pass over the back of the horse, shafts loosely pivoted to said axle, and a driver's seat arranged on the top of said axle, substantially as described.

3. The combination, in a trotting-sulky, of an axle arched to pass over the back of a horse, traction-shafts loosely pivoted to each side of the axle of said sulky, and the means, substantially as described, for attaching the sulky to the horse.

4. In a trotting-sulky, the combination of the wheels A, axle B, and movable shafts G, substantially as described.

5. In a trotting-sulky, the combination of the axle B, shafts G, seat C, and braces D and E, substantially as described.

6. In combination with a trotting-sulky, a harness consisting of loops or a fastening device attached to the saddle and adapted to secure the shafts, and a breast-collar forming a part of said harness, provided with a strap or straps and connected with the axle of said sulky, substantially as described.

7. In combination with a trotting-sulky, a harness consisting of a saddle provided with the adjustable loops I, a collar, K, straps J, straps L, and strap M, all arranged substantially as and for the purpose set forth.

8. In a trotting-sulky, an axle arched to pass over the body of the horse, and divided so that its body or central portion shall be vertically adjustable relatively to its horizontal arms, substantially as and for the purpose set forth.

CHAS. F. STILLMAN.

Witnesses:
GEO. H. BENJAMIN,
A. E. SEXTON.